United States Patent [19]

Thorp et al.

[11] 4,137,297

[45] Jan. 30, 1979

[54] PROCESS FOR THE PRODUCTION OF TITANIUM DISULPHIDE

[75] Inventors: Anthony J. Thorp, Immingham; Frank Clamp, Grimsby; Raoul Feld, Cleethorpes; Joseph E. Page-Gibson, Grimsby; Keith Archer, Brigg, all of England

[73] Assignee: Laporte Industries Limited, Great Britain

[21] Appl. No.: 856,605

[22] Filed: Dec. 1, 1977

[51] Int. Cl.$^2$ .................... C01G 23/00; C01B 7/08
[52] U.S. Cl. .................... 423/561 R; 423/481
[58] Field of Search .................... 423/561 R, 481

[56] References Cited

U.S. PATENT DOCUMENTS

| 3,979,500 | 9/1976 | Sheppard et al. | 423/561 R |
| 3,980,761 | 9/1976 | Thompson et al. | 423/561 R |

FOREIGN PATENT DOCUMENTS

| 1558050 | 1/1969 | France | 423/561 R |
| 878101 | 9/1961 | United Kingdom | 423/561 R |
| 1033584 | 6/1966 | United Kingdom | 423/561 R |

Primary Examiner—O. R. Vertiz
Assistant Examiner—Gary P. Straub
Attorney, Agent, or Firm—Kane, Dalsimer, Kane, Sullivan and Kurucz

[57] ABSTRACT

Titanium disulphide having a stoichiometry very near to the theoretical value may be produced by reacting titanium tetrachloride and hydrogen sulphide in the vapor phase under controlled temperature conditions, the product particles being entrained in a gas stream and thereby removed from the reaction zone. The partial pressure of the reactants is preferably also controlled. Product particles substantially consisting of particles having diameters in the range 1 to 50 microns may be produced. The product may be used as a cathode material in batteries.

16 Claims, No Drawings

PROCESS FOR THE PRODUCTION OF TITANIUM DISULPHIDE

BACKGROUND OF THE INVENTION

1. Field of the Invention

This invention relates to the production of titanium compounds, particularly to the production of titanium disulphide.

2. Brief Description of the Prior Art

Titanium disulphide has been proposed as, or for use in, lubricants. For such an application the precise stoichiometry of the titanium disulphide was not considered to be of importance. It has now been suggested that titanium disulphide may be used as a cathode material in certain types of batteries and that for this end use it is important that the stoichiometry of such titanium disulphide be at or near the theoretical value.

U.S. Pat. No. 3,980,761 describes a method for the preparation of titanium disulphide which method comprises heating metallic titanium to a reaction temperature between about 400° C. and 1000° C., contacting the heated titanium with less than stoichiometric amounts of elemental sulphur and then annealing the titanium-rich non-stoichiometric titanium disulphide so produced at a temperature between about 400° C. and 600° C. in an atmosphere having a sulphur partial pressure substantially equal to the equilibrium sulphur partial pressure over titanium disulphide at the annealing temperature to form substantially stoichiometric titanium disulphide. As specifically described in the aforesaid United States Patent the reaction between the heated titanium and the elemental sulphur was allowed to proceed for one week and the annealing stage of the process was then conducted for a further time of one week. Titanium disulphide so produced could be represented by the formula $Ti_yS_2$ where y has a value from about 1.00 to 1.02.

The present invention relates to a new or improved process for producing titanium disulphide.

SUMMARY OF THE INVENTION

The present invention provides a process for the production of titanium disulphide comprising forming a dry oxygen-free reactant gas mixture having a mixed gas temperature, as herein defined, of from 460° C. to 570° C. and comprising titanium tetrachloride, and hydrogen sulphide, the hydrogen sulphide being in an excess over the stoichiometric quantity for reaction with the titanium tetrachloride, and the titanium tetrachloride and the hydrogen sulphide being separately preheated, passing the reactant gas mixture through a reaction zone as a gas stream having a velocity sufficient to entrain particles of titanium disulphide formed in the course of the reaction, subjecting the gas stream to a positive heat gradient in the reaction zone, removing the entrained titanium disulphide particles from the reaction zone and recovering the titanium disulphide particles from the entraining gases.

DETAILED DESCRIPTION OF THE INVENTION

The term "mixed gas temperature" is used herein to mean the temperature which the reaction mixture would reach within the reaction zone if no reaction were to take place upon mixing and if the reaction stream were not subjected to the heat gradient. The mixed gas temperature is calculable from the volumes and temperatures of the constituents of the reactant gas stream, bearing in mind the possibility of heat losses during the transport of preheated constituents of the reactant gas stream to the reaction zone.

When we refer to a dry oxygen-free reactant gas mixture we mean that normal precautions should be employed to remove water vapour and oxygen from the constituents of the gas mixture so that the residual levels of these substances are as low as reasonably practicable. If water vapour is present in the reactant gas mixture it could react with the titanium tetrachloride resulting in the formation of small particles of titanium oxychloride. If oxygen is present in the reactant gas stream it could react with the titanium tetrachloride to form small particles of titanium dioxide. Titanium oxychloride or titanium dioxide so formed are undesirable impurities in the titanium disulphide product. Preferably the quantity of hydrogen present in the reactant gas stream is also as low as possible since its presence could affect the stoichiometry of the titanium disulphide product by a reduction mechanism.

The close control of temperatures is extremely important for the efficient operation of the present process. The mixed gas temperature is preferably not more than 560° C. and, particularly preferably, not more than 540° C. The mixed gas temperature is preferably at least 470° C. and, particularly preferably, at least 475° C. Particularly suitably the mixed gas temperature is from 475° C. to 510° C.

Differences between the temperatures of the constituents of the reactant gas mixture are preferably minimised or avoided. Preferably any difference between the temperatures of the constituents of the reactant gas mixture is less than 100° C. particularly preferably less than 50° C.

Hydrogen sulphide gas tends to decompose at lower temperatures than might be expected from the published literature. The decomposition of hydrogen sulphide gas during the operation of the present process could result in a relatively high content of sulphur in the titanium disulphide product. Since sulphur is an undesirable impurity it would be necessary to conduct a further process step to remove the sulphur, for example, by solvent extraction. The hydrogen sulphide should preferably, therefore, not be preheated to a temperature above 600° C. and further should preferably not be preheated using heat exchange surfaces having a temperature above 650° C.

The positive inward heat gradient utilised in the present process tends to counteract any tendency for the temperature of the reactant gas mixture to drop due to the endothermicity of the reaction between titanium tetrachloride and hydrogen sulphide. Such a heat gradient may be achieved by heat exchange with a wall surrounding the reaction zone and maintained at or above the mixed gas temperature by external heating means. For example the wall may be equipped with electrical heating means and externally lagged to reduce heat loss. Preferably, and to ensure so far as possible that the temperature of the reactant gas stream does not fall below 460° C. the positive gradient is provided by heat exchange with a material having a temperature of at least 490° C., for example, by heat exchange with a reactor wall. Preferably the said material has a temperature less than 100° C. and particularly preferably less than 50° C. above the mixed gas temperature employed.

Preferably the preheat temperature of each constituent of the reactant gas mixture and the temperature of the material used to achieve the positive temperature gradient are all in the range 460° C. to 570° C.

Preferably the reactant gas mixture contains an inert diluent gas.

For the efficient operation of the present process it is important to select the initial partial pressures of the constituents of the reactant gas mixture. Preferably the initial partial pressures of the titanium tetrachloride and the hydrogen sulphide are from 0.01 to 0.25 and from 0.05 to 0.60 atmospheres respectively. Particularly preferably the initial partial pressures of the titanium tetrachloride and the hydrogen sulphide are from 0.02 to 0.20 and from 0.10 to 0.50 atmospheres respectively, for example, from 0.03 to 0.12 and from 0.10 to 0.35 atmospheres respectively. In one very efficient embodiment of the present process the titanium tetrachloride has an initial partial pressure of from 0.05 to 0.12 atmospheres and the hydrogen sulphide has an initial partial pressure of from 0.20 to 0.35 atmospheres. The inert diluent gas may, for example, be argon, helium or nitrogen. Preferably the inert diluent gas is divided between the titanium tetrachloride and the hydrogen sulphide and mixed with these gases before they are introduced into the reactant gas mixture.

Preferably, for the efficient operation of the present process, the hydrogen sulphide is present in an excess of at least 25% and not more than 100% and, particularly preferably, from 25% to 75% in excess of the stoichiometric quantity for the formation of titanium disulphide.

Preferably, the present process is operated in a tube or tunnel reactor. Particularly suitable materials of construction for the reactor are silica or other similar refractory materials. The reactor may be positioned vertically or horizontally. It is a basic requirement of the present process that the particles of titanium disulphide be formed in a gaseous medium. If the reactor is positioned vertically and the reactant stream flows downwardly the particles as formed will be in free fall and a high minimum velocity in the reactant gas stream will not be necessary. In such a case it is preferred that the reactant gas stream has a velocity giving a Reynolds Number of from 100 to 400. On the other hand, if the reactant is positioned horizontally, a velocity high enough to entrain the particles of titanium disulphide will be necessary. It is desirable to avoid, so far as possible, localised zones within the reaction zone in which hydrogen sulphide is not in excess over titanium tetrachloride. Preferably, therefore, the reactants are in turbulence at their point of entry into the reactor and, for example, titanium tetrachloride may be passed into a turbulant body of hydrogen sulphide. Preferably the titanium tetrachloride and hydrogen sulphide are passed into a reactor in the form of streams having Reynolds Numbers of at least 3000. Preferably the dimensions of the reactor are such that the reactant stream has a Reynolds Number below 2000.

Preferably the reactants have a residence time of from 2 to 20 seconds, for example from 3 to 10 seconds, in the reaction zone.

The titanium disulphide particles are suitably separated from entraining gases by passing the gas stream to a collection box the box being maintained at a temperature above the dew point of volatile chlorides, e.g. $TiCl_4$, present therein and preferably also maintained at a temperature not above 250° C. Preferably the collection box is maintained at a temperature of from 130° C. to 200° C. The titanium disulphide particles are then allowed to cool under dry oxygen-free gas such as nitrogen. The desired temperature control may be attained by the use of an unlagged or partially lagged pipe through which the entrained product is transported to the collection box from the reaction zone. The product is preferably stored under an inert gas such as nitrogen. Titanium disulphide can be pyrophoric and the usual safety precautions should be used to prevent ignition.

The invention will now be illustrated by means of the following Examples. Examples 3 and 7 are according to the invention. Examples, 1, 2, 4 and 6 are comparative Examples.

The reactor used was a vertically positioned silica tube 4 inches in diameter and 34 inches in length in the case of Examples 1 to 3 and 7 and 1½ inches in diameter and 19 inches in length in the case of Examples 4 to 6.

In the 4" reactor an inlet pipe for $TiCl_4$ 0.118 inches in diameter protruded axially 5 inches into the reactor from the upper end and $H_2S$ inlet pipe 0.118 inches in diameter was fixed tangentially into the reactor wall 3½ inches below the upper end of the reactor. The $TiCl_4$ and $H_2S$ inlet pipes were connected to preheaters and suitably lagged to reduce heat losses. The $TiCl_4$ was vapourised in a boiler before being passed to the preheater. The reactor was provided with external electrically operated heating means over the portion extending from 2 to 30 inches from the top of the reactor and was suitably lagged. Means to measure the temperature within the $TiCl_4$ and $H_2S$ inlet pipes and at the internal surface of the reactor wall were provided.

In the 1½ inch reactor an inlet pipe for $TiCl_4$ 0.118 inches in diameter protruded axially 3 inches into the reactor from the upper end. The $H_2S$ inlet was a 1 inch diameter pipe externally co-axial with the $TiCl_4$ pipe so that in use the $TiCl_4$ discharged into an atmosphere of $H_2S$. A similar arrangement of co-axial tubes passing through a preheater was used to preheat the reactants. The reactor was provided with external electrical heating means over the upper 14 inches of its length and was lagged. Means for temperature measurement as in the 4 inch reactor were provided.

Both reactors opened into a collection box maintained at a temperature above 136° C. in which particles of product were allowed to disentrain.

In carrying out Examples 1 to 6 preheated streams of $TiCl_4$ and $H_2S$ diluted with argon were passed into the reactor already heated to the desired temperature, reaction occuring while the resulting reactant stream was passing through the reactor. The resulting particles of titanium disulphide were collected and subjected variously to particle size analysis, x-ray diffraction analysis for structure and thermogravimetric and chemical analysis to determine stoichiometry and the quantities of impurities. Example 7 was carried out in a similar manner except that the diluent gas was nitrogen. The $TiCl_4$ used was commercially pure, as used for the manufacture of titanium dioxide pigment by the chloride process. The $H_2S$ used was commercially pure (>99% wt $H_2S$) and, additionally, had been dried by passing it through a molecular sieve. The argon and nitrogen used were passed over solid manganous oxide in the cold and were then passed through a molecular sieve to remove moisture. The process conditions and the results of the examination of the products are shown in the following Table.

TABLE

| | PART A | | |
|---|---|---|---|
| Example No. | 1 | 2 | 3 |

TABLE-continued

| | | | |
|---|---|---|---|
| TiCl₄ l/min | 0.94 | 1.18 | 0.94 |
| Diluent gas l/min | 10 | 10 | 10 |
| Preheat °C gas temp. | 450 | 450 | 545–585 |
| H₂S l/min | 3 | 3 | 3 |
| Diluent gas l/min | 10 | 10 | 10 |
| Preheat °C gas temp. | 450 | 410 | 540–565 |
| Reactant stream | | | |
| Mixed gas temp. °C | 450 | 447 | 558 |
| H₂S/TiCl₄ moles | 3.125 | 2.5 | 3.075 |
| TiCl₄ ⎫ partial pressure | 0.04 | 0.05 | 0.04 |
| H₂S ⎬ (atmospheres) | 0.125 | 0.124 | 0.125 |
| Reactor wall temp. °C | 450 | 500 | 550–560 |
| TiS₂ product yield % | 3 | 49 | 61 |
| x in Ti$_x$S₂ | — | 1.0 | 1.02 |
| Particle size range-μ | — | 1–2 | 1–20 |
| Average-μ | — | — | 8 |
| X-ray diffraction analysis titanium-sulphide | Di/tri- | — | di- |
| Impurities S% | — | 3.8 | 1.6 |
| Cl% | — | — | 0.7 |

PART B

| Example No. | 4 | 5 | 6 | 7 |
|---|---|---|---|---|
| TiCl₄ l/min | 0.49 | 0.45 | 0.96 | 2.2 |
| Diluent gas l/min | 2.8 | 3 | 3 | 7 |
| Preheat °C gas temp. | 575 | 640 | 685 | 460–470 |
| H₂S l/min | 1.5 | 0.6 | 2.0 | 6 |
| Diluent gas l/min | 0 | 0 | 0 | 7 |
| Preheat °C 0.05-temp. | 575 | 640 | 685 | 470–500 |
| Reactant stream | | | | |
| Mixed gas temp. °C | 575 | 640 | 685 | 477 |
| H₂S/TiCl₄ moles | 3.1 | 0.73 | 1.125 | |
| TiCl₄ ⎫ partial pressure | 0.1 | 0.15 | 0.16 | 0.09 |
| H₂S ⎬ (atmospheres) | 0.31 | 0.11 | 0.34 | 0.27 |
| Reactor wall temp. °C | 635 | 700 | 750 | 480–500 |
| TiS₂ product yield % | — | — | — | 84 |
| x in Ti$_x$S₂ | 1.06 | 1.1 | 1.2 | 1.00 |
| Particle size range-μ | 0.05–0.4 | <1 | <1 | 1–25 |
| Average-μ | 0.25 | — | — | 15 |
| X-ray diffraction analysis titanium-sulphide | — | — | — | di- |
| Impurities S% | 6.5 | 4.1 | 8.5 | 0.54 |
| Cl% | 0.4 | 0.9 | 1.1 | 0.8 |

| | |
|---|---|
| Example 1 | hardly any reaction occurred due to the low temperatures of the titanium tetrachloride and hydrogen sulphide and the low reactor wall temperature. |
| Example 2 | the product has exact stoichiometry but the yield was reduced due to the low temperature of the hydrogen sulphide and an insufficiently high mixed gas temperature. |
| Example 3 | the yield was good and the impurity levels in the product were low but the product has departed somewhat from exact stoichiometry due to the higher temperature used. |
| Examples 4–6 | due to the increasing temperature there is an unacceptable departure from stoichiometry and an unacceptably high level of sulphur in the product. |
| Example 7 | the product has exact stoichiometry and a low sulphur and chlorine impurity level and was obtained in excellent yield. Note the change in the partial pressures of titanium tetrachloride and hydrogen sulphide in Examples 4–7 in comparison with Examples 1–3. The particle size of the product of Examples 3 and 7 is particularly advantageous. It is a feature of this invention that the product does not have either the extremely small particle size characteristic of a prior vapour phase process (majority <2 microns diameter) or the very large particle size characteristic of prior fluid bed processes but has an intermediate size in the range 1 to 50 microns. It is a preferred feature of the invention that the product substantially consists of particles having diameters in the range 1 to 25 microns and, particularly preferably, having an average particle size in the range 6 to 16 microns. The above described particle sizes are associated with particular product utility. |

What we claim is:

1. A process for the production of titanium disulphide, which comprises; forming a dry, oxygen-free, hydrogen-free reactant gas mixture having a mixed gas temperature, of from 460° C. to 570° C. by mixing preheated titanium tetrachloride and hydrogen sulfide streams and comprising an inert gas, titanium tetrachloride and hydrogen sulphide, the hydrogen sulphide being in an excess over the stoichiometric quantity for reaction with the titanium tetrachloride, and the titanium tetrachloride and the hydrogen sulphide streams, both containing inert gas being separately preheated to temperatures within 50° C. of each other, the hydrogen sulphide not being preheated to above 600° C. nor using a heat source above 650° C.; passing the reactant gas mixture through a reaction zone as a gas stream having a velocity sufficient to entrain particles of titanium disulphide formed in the course of the reaction, heating the gas stream in the reaction zone by means of a heat source having a temperature less than 50° C. above the mixed gas temperature, removing the entrained titanium disulphide particles from the reaction zone and recovering the titanium disulphide particles from the entraining gases said particles having the composition Ti$_x$S₂, where x has a value from 1.00 to 1.02, and a particle size range of 1–25 microns.

2. A process as claimed in claim 1 wherein the mixed gas temperature is at least 470° C.

3. A process as claimed in claim 2 wherein the mixed gas temperature is not more than 540° C.

4. A process as claimed in claim 3 wherein the mixed gas temperature is from 475° C. to 510° C.

5. A process as claimed in claim 1 wherein said particles have a particle size range of 6–16 microns.

6. A process as claimed in claim 1 wherein the heating is provided by heat exchange with a material having a temperature of at least 490° C.

7. A process as claimed in claim 1 wherein the initial partial pressure of titanium tetrachloride in the reactant gas mixture is from 0.01 to 0.25.

8. A process as claimed in claim 1 wherein the initial partial pressure of the hydrogen sulphide in the reactant gas mixture is from 0.05 to 0.60.

9. A process as claimed in claim 8 wherein the initial partial pressures of titanium tetrachloride and hydrogen sulphide in the reactant gas mixture are respectively from 0.02 to 0.20 and from 0.10 to 0.50.

10. A process as claimed in claim 9 wherein the said initial partial pressures are from 0.03 to 0.12 and from 0.10 to 0.35 respectively.

11. A process as claimed in claim 10 wherein the said initial partial pressures are from 0.05 to 0.12 and from 0.20 to 0.35 respectively.

12. A process as claimed in claim 1 wherein the hydrogen sulphide is initially in the reactant gas mixture in an excess of from 25% to 75% over the quantity required in theory to react with the titanium tetrachloride.

13. A process as claimed in claim 1 wherein the separately preheated titanium tetrachloride and hydrogen sulphide each mixed with inert diluent gas are passed into a reactor in the form of streams having Reynolds Numbers at their points of entry into the reactor of at least 3000 and the reactant gas stream formed in the reactor has a Reynolds Number below 2000.

14. A process as claimed in claimm 1 wherein the residence time of the reactant gas in the reaction zone is from 2 seconds to 20 seconds.

15. A process as claimed in claim 1 wherein the titanium disulphide particles are separated from the entraining gases by passing the gas stream into a collection box maintained at a temperature above the dew point of titanium tetrachloride in the stream but not above 250° C.

16. A process as claimed in claim 15 wherein the collection box is maintained at a temperature of from 130° C. to 200° C.

* * * * *

UNITED STATES PATENT AND TRADEMARK OFFICE
CERTIFICATE OF CORRECTION

PATENT NO. : 4,137,297

DATED : January 30, 1979

INVENTOR(S) : Anthony J. Thorp, Frank Clamp, Raoul Feld, Joseph E. Page-Gibson and Keith Archer It is certified that error appears in the above-identified patent and that said Letters Patent are hereby corrected as shown below:

At Column 5, line 3, Example No. 2 of Table; - "450" should read -- 490 -- .

At column 5, line 23, - after °C. delete "0.05" and insert in its place -- gas -- .

Signed and Sealed this

First Day of May 1979

[SEAL]

Attest:

RUTH C. MASON
Attesting Officer

DONALD W. BANNER
Commissioner of Patents and Trademarks